(12) United States Patent
Liu

(10) Patent No.: US 12,407,623 B2
(45) Date of Patent: Sep. 2, 2025

(54) BANDWIDTH ADJUSTMENT METHOD AND TERMINAL

(71) Applicant: ZTE CORPORATION, Guangdong (CN)

(72) Inventor: Feng Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 533 days.

(21) Appl. No.: 17/801,470

(22) PCT Filed: Oct. 15, 2020

(86) PCT No.: PCT/CN2020/121009
§ 371 (c)(1),
(2) Date: Aug. 22, 2022

(87) PCT Pub. No.: WO2021/169319
PCT Pub. Date: Sep. 2, 2021

(65) Prior Publication Data
US 2023/0100886 A1     Mar. 30, 2023

(30) Foreign Application Priority Data
Feb. 28, 2020 (CN) .......................... 202010131291.3

(51) Int. Cl.
*H04L 47/76* (2022.01)
*H04L 47/80* (2022.01)

(52) U.S. Cl.
CPC .............. *H04L 47/76* (2013.01); *H04L 47/80* (2013.01)

(58) Field of Classification Search
CPC ............. H04L 41/0876; H04L 41/0893; H04L 41/0896; H04L 47/10; H04L 47/76; H04L 47/80; H04Q 11/04; H04W 28/20
See application file for complete search history.

(56) References Cited

U.S. PATENT DOCUMENTS

| 7,873,063 B2 * | 1/2011 | Takata .................. H04W 16/04 370/419 |
| 9,936,450 B2 * | 4/2018 | Onaka ................... H04W 92/20 |

(Continued)

FOREIGN PATENT DOCUMENTS

| EP | 2978237 A1 | 1/2016 |
| WO | WO 2019128467 A1 | 7/2019 |

OTHER PUBLICATIONS

European Patent Office, EP20920862.8 Extended European Search Report issued on Jan. 30, 2024.

*Primary Examiner* — Alpus Hsu
(74) *Attorney, Agent, or Firm* — Li & Cai Intellectual Property (USA) Office

(57) ABSTRACT

Embodiments of the disclosure provide bandwidth adjustment method applicable to sending end, the sending end periodically sends cells to receiving end, and a number of cells sent in each period is n, where n is an integer greater than or equal to 2; in each period, the sending end occupies a cell having a number that is within a bearer cell group of the sending end, the occupied cell is capable of carrying service information, and the method includes: sending adjustment information including adjustment operation to the receiving end, with the adjustment operation being adding a cell number to be adjusted to the bearer cell group of the sending end, or deleting the cell number to be adjusted from the bearer cell group of the sending end; and receiving confirmation information sent by the receiving end, and performing the adjustment operation. Embodiments of the disclosure further provide a terminal.

10 Claims, 6 Drawing Sheets send adjustment information including an adjustment operation to the receiving end, with the adjustment operation being adding a cell number to be adjusted to the bearer cell group of the sending end, or deleting the cell number to be adjusted from the bearer cell group of the sending end — S101 receive confirmation information sent by the receiving end, and perform the adjustment operation — S102

(56) References Cited

U.S. PATENT DOCUMENTS

| | | | |
|---|---|---|---|
| 10,271,252 B2* | 4/2019 | Jung | H04W 48/08 |
| 10,368,195 B2* | 7/2019 | Tian | H04W 8/005 |
| 10,383,051 B2* | 8/2019 | Onaka | H04W 36/165 |
| 2013/0195458 A1 | 8/2013 | Luo et al. | |
| 2014/0307603 A1* | 10/2014 | Barany | H04W 76/28 |
| | | | 370/311 |
| 2020/0413305 A1* | 12/2020 | Rahman | H04W 36/249 |

* cited by examiner

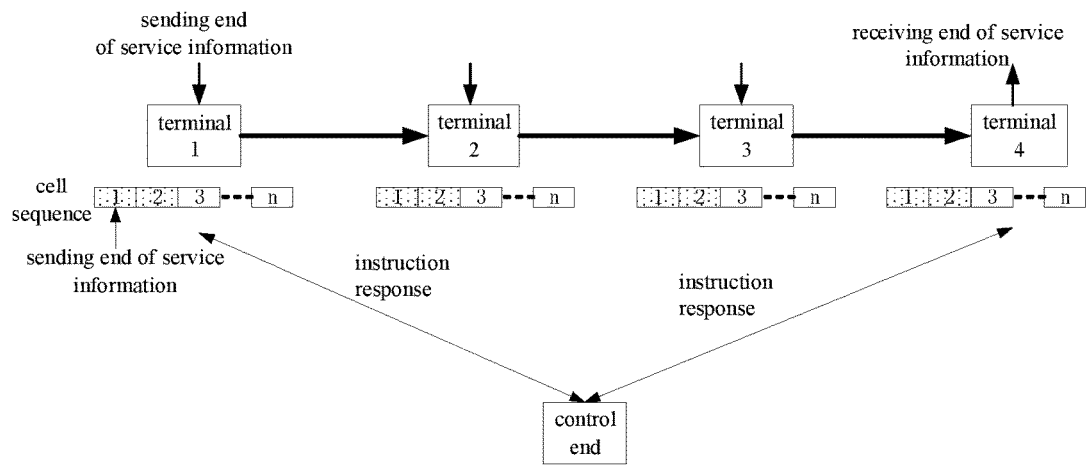

FIG. 3

```
send the adjustment information including the adjustment operation to the receiving end
through a control end, with the adjustment information being adding the cell number to
be adjusted to the bearer cell group of the sending end, or deleting the cell number to be
              adjusted from the bearer cell group of the sending end
```
S201

```
receive, through the control end, the confirmation information sent by the receiving end,
                      and perform the adjustment operation
```
S202

FIG. 4

BANDWIDTH ADJUSTMENT METHOD AND TERMINAL

TECHNICAL FIELD

Embodiments of the present disclosure relate to the field of information transmission technology, and in particular, to a bandwidth adjustment method and a terminal.

BACKGROUND

Transmitting service information (such as client service information) by means of bytes, like what happens in a Synchronous Digital Hierarchy (SDH) network, has the advantages of high reliability and small delay because a pipe for transmitting the service information is exclusive. Transmitting the service information by means of messages, like what happens in a data network, has the advantage of low transmission cost.

Transmitting the service information by means of cells not only has the advantages the same as those of the SDH network, that is, the high reliability and the small delay, but can also achieve low transmission cost like the data network, and thus has the advantages of both the SDH network and the data network.

When the service information is transmitted by means of the cells, real-time rates of different clients at different time vary, and a bandwidth (i.e., an allowed real-time maximum rate) of each client may be adjusted according to the rates in order to reduce unnecessary occupation of a network. With existing bandwidth adjustment methods, transmission of the service information needs to be suspended before adjusting a bandwidth, which may affect the transmission of the service information.

SUMMARY

The embodiments of the present disclosure provide a bandwidth adjustment method and a terminal.

In a first aspect, an embodiment of the present disclosure provides a bandwidth adjustment method applicable to a sending end, the sending end periodically sends cells to a receiving end, and a number of the cells sent in each period is n, where n is an integer greater than or equal to 2; in each period, the sending end occupies a cell having a number that is within a bearer cell group of the sending end, the occupied cell is capable of carrying service information, and the method includes: sending adjustment information including an adjustment operation to the receiving end, with the adjustment operation being adding a cell number to be adjusted to the bearer cell group of the sending end, or deleting the cell number to be adjusted from the bearer cell group of the sending end; and receiving confirmation information sent by the receiving end, and performing the adjustment operation.

In some embodiments, sending the adjustment information to the receiving end includes: sending the adjustment information to the receiving end through a control end; and receiving the confirmation information sent by the receiving end includes: receiving, through the control end, the confirmation information sent by the receiving end.

In some embodiments, sending the adjustment information to the receiving end includes: adding the adjustment information to a cell having a number the same as the cell number to be adjusted, and sending the cell to the receiving end.

In some embodiments, the cell includes a loading status value configured to indicate whether the cell carries the service information; and adding the adjustment information to the cell having the number the same as the cell number to be adjusted includes: if the adjustment operation is deleting the cell number to be adjusted from the bearer cell group of the sending end, setting loading status values of a plurality of continuous cells having a number the same as the cell number to be adjusted to a value indicating that the cells do not carry the service information.

In some embodiments, the adjustment information includes: the cell number to be adjusted; and an occupation status value configured to indicate whether the cell number to be adjusted is within the bearer cell group of the sending end.

In a second aspect, an embodiment of the present disclosure provides a bandwidth adjustment method applicable to a receiving end, the receiving end receives cells periodically sent by a sending end, and a number of the cells sent in each period is n, where n is an integer greater than or equal to 2; in each period, the sending end occupies a cell having a number that is within a bearer cell group of the sending end, the occupied cell is capable of carrying service information, and the method includes: receiving adjustment information sent by the sending end, with the adjustment information including an adjustment operation which is adding a cell number to be adjusted to the bearer cell group of the sending end, or deleting the cell number to be adjusted from the bearer cell group of the sending end; and performing a preparation operation according to the adjustment information, and sending confirmation information to the sending end after the preparation operation is completed.

In some embodiments, receiving the adjustment information sent by the sending end includes: receiving, through a control end, the adjustment information sent by the sending end; and sending the confirmation information to the sending end includes: sending the confirmation information to the sending end through the control end.

In some embodiments, the receiving end sends a reply cell to the sending end periodically, and sending the confirmation information to the sending end includes: adding the confirmation information to the reply cell, and sending the reply cell to the sending end.

In some embodiments, the confirmation information includes: the cell number to be adjusted; and an information response value configured to indicate whether the preparation operation is completed by the receiving end.

In a third aspect, an embodiment of the present disclosure provides a terminal, where the terminal periodically sends cells to a receiving end, a number of the cells sent in each period is n, where n is an integer greater than or equal to 2; in each period, the terminal occupies a cell having a number that is within a bearer cell group of the terminal, the occupied cell is capable of carrying service information, and the terminal includes: a first sending module configured to send adjustment information including an adjustment operation to the receiving end, with the adjustment operation being adding a cell number to be adjusted to a bearer cell group of a sending end, or deleting the cell number to be adjusted from the bearer cell group of the sending end; and a first receiving module configured to receive confirmation information sent by the receiving end, and perform the adjustment operation.

In a fourth aspect, an embodiment of the present disclosure provides a terminal, where the terminal receives cells periodically sent by a sending end, a number of the cells sent in each period is n, where n is an integer greater than or equal to 2; in each period, the sending end occupies a cell having a number that is within a bearer cell group of the sending end, the occupied cell is capable of carrying service information, and the terminal includes: a second receiving module configured to receive adjustment information sent by the sending end, with the adjustment information including an adjustment operation which is adding a cell number to be adjusted to the bearer cell group of the sending end, or deleting the cell number to be adjusted from the bearer cell group of the sending end; and a second sending module configured to perform a preparation operation according to the adjustment information, and send confirmation information to the sending end after the preparation operation is completed.

With the bandwidth adjustment method provided by the embodiments of the present disclosure, a bandwidth of a client can be adjusted without suspending transmission of the service information, thus ensuring that a service of the client is not affected when the bandwidth of the client is adjusted.

BRIEF DESCRIPTION OF DRAWINGS

The accompany drawings are intended to provide a further understanding of the present disclosure and constitute a part of the specification. Together with the embodiments of the present disclosure, the drawings are used to explain the present disclosure, but do not constitute any limitation to the present disclosure. The above and other features and advantages will become more apparent to those of ordinary skill in the art through the description of specific exemplary embodiments with reference to the drawings. In the drawings:

FIG. 3 is a schematic diagram of another bandwidth adjustment method according to an embodiment of the present disclosure;

FIG. 4 is a flowchart illustrating another bandwidth adjustment method applicable to the sending end according to an embodiment of the present disclosure;

DETAIL DESCRIPTION OF EMBODIMENTS

Figure 1:
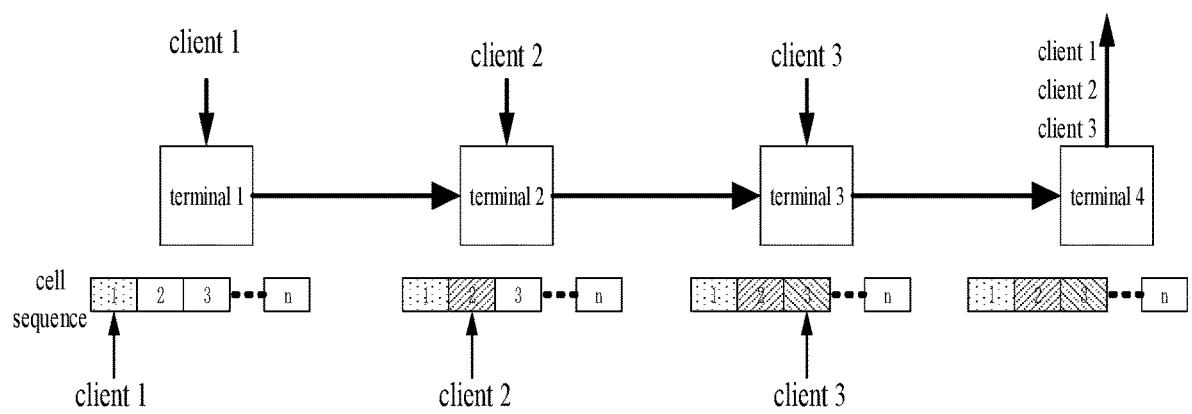
FIG. 1 is a schematic diagram illustrating a process of transmitting service information by adopting cells.

In order to enable those of ordinary skill in the art to better understand the technical solutions of the embodiments of the present disclosure, the bandwidth adjustment method and the terminals provided by the embodiments of the present disclosure are described in detail below with reference to the accompanying drawings.

The embodiments of the present disclosure will be described more fully below with reference to the drawings, but the embodiments illustrated herein may be embodied in different forms and should not be interpreted as being limited to the embodiments described herein. Rather, the embodiments are provided to make the present disclosure thorough and complete, and are intended to enable those of ordinary skill in the art to fully understand the scope of the present disclosure.

The embodiments of the present disclosure can be described with reference to plans and/or cross-sectional views with the aid of idealized schematic diagrams of the present disclosure. Accordingly, the exemplary drawings may be modified according to manufacturing techniques and/or tolerances.

The embodiments of the present disclosure and the features thereof may be combined with one another if no conflict is incurred.

The terms used herein are merely used to describe particular embodiments, and are not intended to limit the present disclosure. As used herein, the term "and/or" includes any one or all combinations of one or more associated listed items. As used herein, "a" and "the" indicating a singular form is also intended to indicate a plural form. Unless expressly stated otherwise in the context, the term "include" and/or "made of . . . " used herein indicates the presence of the described features, integers, steps, operations, elements and/or components, but does not exclude the presence or addition of one or more other features, integers, steps, operations, elements, components and/or combinations thereof.

Unless otherwise defined, all terms (including technical and scientific terms) used herein have the same meaning as commonly understood by those of ordinary skill in the art. It should be further understood that the terms, such as those defined in commonly used dictionaries, should be interpreted as having a meaning that is consistent with a meaning in the context of the existing technology and the present disclosure, and should not be interpreted in an idealized or overly formal sense unless expressly so defined herein.

The embodiments of the present disclosure are not limited to those illustrated by the drawings, but include modifications to configuration formed based on a manufacturing process. Thus, the regions shown in the drawings are illustrative, and shapes of the regions shown in the drawings illustrate specific shapes of regions of elements, but are not intended to make limitations.

DESCRIPTION OF TECHNICAL TERMS

In the present disclosure, unless otherwise specified, the following technical terms should be understood according to the following explanations.

Service information refers to service data (such as videos, mails, and calls) transmitted among clients (such as mobile phones, and computers).

A sending end refers to a client (such as a mobile phone, or a computer) which sends the service data (such as the videos, the mails, and the calls).

A receiving end refers to a client (such as a mobile phone, or a computer) which receives the service data (such as the videos, the mails, and the calls).

The sending end and the receiving end appear in pairs along with the transmission of the service information, that is, in one transmission process of the service information, a client sending the service information is the sending end, and a client receiving the service information is the receiving end. The sending end and the receiving end may be terminals in different forms, for example, the sending end is a mobile phone, and the receiving end is a computer. In different transmission processes of the service information, the sending ends and the receiving ends may be different. For example, when terminal A sends the service information to terminal B, the terminal A is the sending end, and the terminal B is the receiving end; and when the terminal A receives the service information sent by the terminal B, the terminal A is the receiving end, and the terminal B is the sending end.

A cell is an information carrier in equal length. Cell sequences are transmitted on a network physical pipe in sequence, and the service information is mapped to the cells and is carried by the cells for being transmitted.

Each cell carries a number (sequence number), and different cells are distinguished from one another according to the numbers, that is, the physical pipe carrying the cells is divided into a plurality of sub-pipes according to the numbers, and each cell represents one sub-pipe (sub-slot). All the cells are transmitted on the network physical pipe in turn according to the numbers, and the numbers appear circularly (that is, appearing periodically). In each period, different clients (such as mobile phones, and computers) on a network can occupy different cells (the occupied cells are in an "activated" state) respectively according to the numbers of the cells, the cells occupied by each client are called a bearer cell group of the client, and the client can load the service information thereof in part or all of the cells within the bearer cell group to send the service information.

Different clients transmit service information by using different cells, that is, the service information of the different clients is transmitted through the cells having different numbers, so that services of the different clients are not influenced mutually, and the numbers of the cells occupied by the different clients are not necessarily the same (different numbers of cells are selected and occupied according to bandwidths of the different clients). Thus, the bandwidths of the clients can be adjusted by adding or deleting the cells occupied by the clients.

As shown in FIG. 1, all the cells are transmitted from terminal 1 and finally reach terminal 4 via terminal 2 and terminal 3, that is, the terminal 1, the terminal 2, and the terminal 3 are all sending ends, and terminal 4 is the receiving end. Client 1 occupies a cell having a number of 1 through the terminal 1 (that is, adding the cell to a bearer cell group of the client 1), and loads the service information thereof in the cell having the number of 1, client 2 loads the service information thereof in a cell having a number of 2 through the terminal 2, and client 3 loads the service information thereof in a cell having a number of 3 through the terminal 3. The three service flows are respectively loaded on the three cells having different numbers, and finally reach the terminal 4. That is, a relationship between a sending end and a receiving end does not exist between the terminal 1 and the terminal 2. Similarly, the relationship between the sending end and the receiving end does not exist between the terminal 2 and the terminal 3, and does not exist between the terminal 1 and the terminal 3 as well.

If a bandwidth of the physical pipe is B (bit/s) and the number of the cells is n in a circle period, a bandwidth represented by each cell having a number is B/n. When the service information of the client 1 is exclusively loaded on the cell having the number of 1, a bandwidth of the client 1 is B/n (bit/s). When the service information of the client 1 is loaded on two cells having different numbers, the bandwidth of the client 1 becomes 2*B/n (bit/s).

A real-time rate needed by each client is not fixed and varies constantly, but does not exceed a bandwidth (i.e., an allowed real-time maximum rate) of the client; since different clients cannot share the same cell, that is, each client has a constant bandwidth, and a bandwidth of one client may sometimes be more than enough, and may sometimes fail to meet a requirement, which makes it desirable to adjust the bandwidth in real time.

Figure 2:
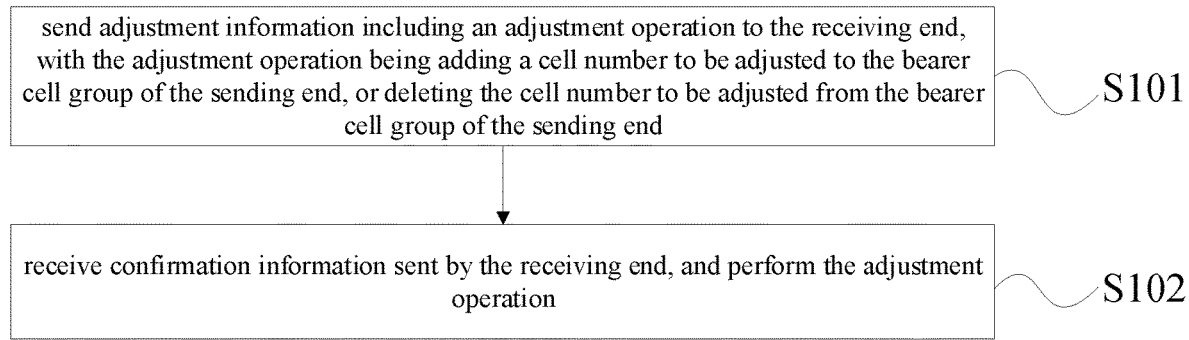
FIG. 2 is a flowchart illustrating a bandwidth adjustment method applicable to a sending end according to an embodiment of the present disclosure.

In a first aspect, with reference to FIG. 2, an embodiment of the present disclosure provides a bandwidth adjustment method applicable to a sending end. The sending end periodically sends cells to a receiving end, and the number of the cells sent in each period is n which is an integer greater than or equal to 2; in each period, the sending end occupies a cell having a number that is within a bearer cell group of the sending end, and the occupied cell may carry service information.

The sending end (such as a mobile phone, or a computer) occupies part of the cells (i.e., the bearer cell group of the sending end) transmitted on a network physical pipe to carry and send the service information to the receiving end. Since several times of transmission may be needed for completely transmitting all the service information to the receiving end, a transmission process of the service information is carried out periodically, that is, the sending end continuously sends the service information to the receiving end through the cells according to a certain rule.

In essence, the cells on the network physical pipe are not generated by the sending end, and are not discarded when reaching the receiving end. In fact, when the cells reach the sending end, the sending end loads the service information in part of the cells, and then sends the cells to the receiving end. After transmission of the service information of the sending end is completed, the cells are released to become idle cells which may be then occupied by other clients.

It should be noted that not all occupied (activated) cells carry the service information in the transmission process of the service information, and an occupied cell may have no load in a certain information transmission process (that is, the cell is still occupied but does not carry the service information).

The bandwidth adjustment method provided by the embodiment of the present disclosure may include S101 and S102.

In S101, adjustment information including an adjustment operation is sent to the receiving end, with the adjustment operation being adding a cell number to be adjusted to the bearer cell group of the sending end, or deleting the cell number to be adjusted from the bearer cell group of the sending end.

The sending end sends the adjustment information to the receiving end (the adjustment information is not necessarily sent to the receiving end through the cells, which will be described in detail later).

The adjustment information is configured to indicate that the sending end is to add the cell number to be adjusted to the bearer cell group of the sending end (that is, activating the cell to increase the bandwidth), or the sending end is to delete the cell number to be adjusted from the bearer cell group of the sending end (that is, stopping using the cell to reduce the bandwidth).

When the bandwidth of the sending end needs to be increased, an unoccupied cell needs to be occupied to carry the service information. In such case, the sending end sends the information requesting addition of the cell number to be adjusted (i.e., a cell number to be occupied) to the bearer cell group of the sending end.

When the bandwidth of the sending end needs to be reduced, some occupied cells may be released to allow the other clients to use more cells. In such case, the sending end sends the information requesting deletion of the cell number to be adjusted (i.e., a cell number to be deleted) from the bearer cell group of the sending end.

In S102, confirmation information sent by the receiving end is received, and the adjustment operation is performed.

After the sending end receives the confirmation information (i.e., the information indicating that the sending end is allowed to adjust the bandwidth) fed back by the receiving end, the sending end performs the adjustment operation corresponding to the adjustment information.

If the corresponding adjustment operation is adding the cell number to be adjusted to the bearer cell group of the sending end, it is indicated that the sending end may occupy a cell having a number the same as the cell number to be adjusted, that is, in each following period, the sending end may occupy the cell whose number is the cell number to be adjusted, and load the service information in the cell having the number the same as the cell number to be adjusted to send the service information to the receiving end.

If the corresponding adjustment operation is deleting the cell number to be adjusted from the bearer cell group of the sending end, an occupied cell having a number the same as the cell number to be adjusted needs to be released, that is, in each following period, the service information may not be loaded in the cell having the number the same as the cell number to be adjusted, and the cell having the number the same as the cell number to be adjusted is vacated, and may be occupied by other terminals for transmission of service information thereof.

Of course, if the sending end does not receive the confirmation information sent by the receiving end, the sending end may not perform the adjustment operation, and should continue to transmit the service information according to a current occupation condition of the cells. After receiving the confirmation information sent by the receiving end, the sending end may adjust the occupation condition of the cells, and start to transmit the service information according to the adjusted occupation condition of the cells.

After sending the adjustment information, the sending end does not perform adjustment until receiving the confirmation information, so that the transmission of the service information may be carried out in real time during the transmission of the adjustment information and the transmission of the confirmation information, without incurring interruption, bit errors and other conditions which affect the transmission of the service information. Thus, the transmission of the service information is not affected.

In some embodiments, as shown in FIG. 4, sending the adjustment information including the adjustment operation to the receiving end, with the adjustment operation being adding the cell number to be adjusted to the bearer cell group of the sending end, or deleting the cell number to be adjusted from the bearer cell group of the sending end (S101) includes: S201, sending the adjustment information including the adjustment operation to the receiving end through a control end, with the adjustment information being adding the cell number to be adjusted to the bearer cell group of the sending end, or deleting the cell number to be adjusted from the bearer cell group of the sending end.

Receiving the confirmation information sent by the receiving end and performing the adjustment operation (S102) includes: S202, receiving, through the control end, the confirmation information sent by the receiving end, and performing the adjustment operation.

As shown in FIG. 3, it may be the case that the sending end and the receiving end send the information to the control end and receive the information from the control end. That is, instead of directly sending the adjustment information by the sending end to the receiving end, the sending end and the receiving end contact the control end respectively.

When the sending end needs to increase the bandwidth, that is, to occupy more cells, the sending end "informs" the control end of the adjustment information requesting addition of the cell number to be adjusted to the bearer cell group of the sending end, and the control end simultaneously sends preparation commands to the sending end and the receiving end (sending the adjustment information to the receiving end, and sending the information, which indicates that the adjustment information is sent to the receiving end, to the sending end) after receiving the adjustment information. The sending end makes preparations after receiving the command (the sending end occupies the cell having the number the same as the cell number to be adjusted, but does not load the service information in the cell), and sends, after being prepared, the information indicating being prepared to the control end. After receiving the information sent by the two ends, the control end forwards the information sent by the sending end to the receiving end, and forwards the information sent by the receiving end to the sending end, so as to inform the two ends that both are prepared. After the sending end receives the information, the sending end loads the service information in the cell having the number the same as the cell number to be adjusted.

When the sending end needs to reduce the bandwidth, that is, to release some occupied cells, the sending end "informs" the control end of the adjustment information requesting deletion of the cell number to be adjusted from the bearer cell group of the sending end, and the control end simultaneously sends preparation commands to the sending end and the receiving end (sending the adjustment information to the receiving end, and sending the information, which indicates that the adjustment information is sent to the receiving end, to the sending end) after receiving the adjustment information. The sending end makes preparations after receiving the command (the sending end stops loading the service information in the cell having the number the same as the cell number to be adjusted), and sends, after being prepared, the confirmation information indicating being prepared to the control end. After receiving the information sent by the two ends, the control end forwards the information sent by the sending end to the receiving end, and forwards the information sent by the receiving end to the sending end, so as to inform the two ends that both are prepared. After the sending end receives the confirmation information, the sending end releases an occupied cell having a number the same as the cell number to be adjusted, that is, the sending end stops loading the service information in the cell having the number the same as the cell number to be adjusted.

Serving as an information transmission end between the sending end and the receiving end in the bandwidth adjustment process, the control end may distinguish the information (the adjustment information, the confirmation information, etc.) sent and received in the bandwidth adjustment process from the service information, so as to facilitate processing different information differently. Meanwhile, the control end may be aware of states of the sending end and the receiving end through the communication with the sending end and the receiving end, so as to issue the commands in a centralized manner, thereby increasing efficiency of service bandwidth adjustment.

That is, the sending end may send the adjustment information to the receiving end in an "out-of-band" way, that is, transmitting the adjustment information through a physical channel different from that of the cells. Similarly, the confirmation information may be received in an out-of-band way. Such out-of-band transmission has the advantage that the transmission of the adjustment information and the transmission of the cells are totally independent of each other and do not affect each other, that is, when a network for the transmission of the adjustment information fails, the transmission of the cells will not be affected, and vice versa.

Of course, when the "out-of-band" way is adopted in the bandwidth adjustment process, a specific form of the adjustment information may vary, which will be described in detail later.

Figure 5:
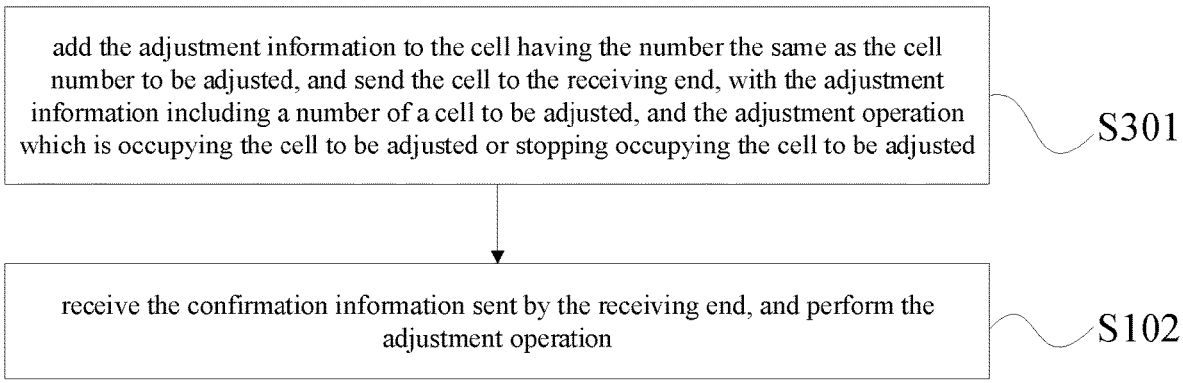
FIG. 5 is a flowchart illustrating still another bandwidth adjustment method applicable to the sending end according to an embodiment of the present disclosure.

In some embodiments, as shown in FIG. 5, sending the adjustment information including the adjustment operation to the receiving end, with the adjustment operation being adding the cell number to be adjusted to the bearer cell group of the sending end, or deleting the cell number to be adjusted from the bearer cell group of the sending end (S101) includes: S301, adding the adjustment information to the cell having the number the same as the cell number to be adjusted, and sending the cell to the receiving end, with the adjustment information including a number of a cell to be adjusted, and the adjustment operation which is occupying the cell to be adjusted or stopping occupying the cell to be adjusted.

That is, the adjustment information may also be sent to the receiving end along with the cell, that is, the adjustment information is inside the cell and is transmitted to the receiving end as a part of the cell. Apparently, each cell carries its own number originally; in order to transmit the adjustment information more conveniently, the adjustment information may be added to the cell having the number the same as the cell number to be adjusted, so that the cell number to be adjusted may be known according to "its own number" of the cell when the cell including the adjustment information is received.

Meanwhile, the receiving end sends a reply cell to the sending end, so that the confirmation information may be included in the cell and received as a part of the cell. Thus, merely one physical channel is needed, which reduces the transmission cost.

In a case where the adjustment information is transmitted along with by the cell, the cell includes a loading status value configured to indicate whether the cell carries the service information according to some embodiments; adding the adjustment information to the cell having the number the same as the cell number to be adjusted includes: if the adjustment operation is deleting the cell number to be adjusted from the bearer cell group of the sending end, setting loading status values of a plurality of continuous cells each having a number the same as the cell number to be adjusted to a value indicating that the cells do not carry the service information.

Figure 6:
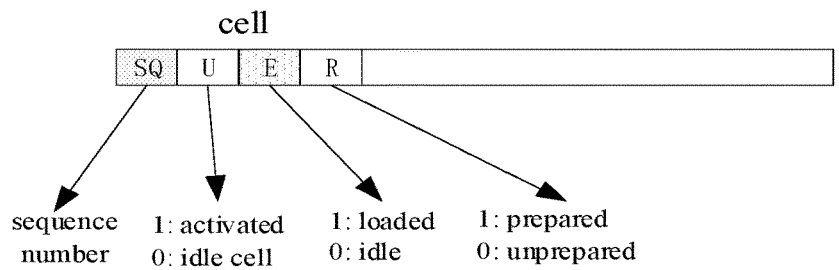
FIG. 6 is a schematic diagram of a composition of adjustment information according to an embodiment of the present disclosure.

A structure of a cell transmitted on the network physical pipe may be found in FIG. 6, and includes its own number (SQ), and a loading status value (E) configured to indicate whether a current cell carries the service information. For example, E being "0" may indicate that the cell does not carry the service information, and E is "1" may indicate that the cell carries the service information, so that when the loading status value is "1", it indicates that the cell carries the service information. Of course, when E is 1, there is no doubt that the cell is occupied (activated), but when E is 0, the cell may be unoccupied, or may be occupied without carrying the service information.

When the cell has the loading status value, if the sending end needs to reduce the bandwidth, that is, to delete the cell number to be adjusted from the bearer cell group of the sending end, the sending end may include the adjustment information in the plurality of continuous cells (such as three cells) having a number the same as the cell number to be adjusted to transmit the adjustment information to the receiving end, which may be: setting the loading status values of the cells having the number the same as the cell number to be adjusted to a value indicating that the cells do not carry the service information, and meanwhile not loading the service information in the cells. At this time, although the cells do not carry the service information, the cells are still occupied, and are sent to the receiving end by the sending end. When the receiving end finds that the plurality of received cells having the same number are all occupied but do not carry the service information, the sending end may determine that the sending end is to stop occupying the cells having such number.

In some embodiments, as shown in FIG. 6, the adjustment information includes: the cell number the to be adjusted; and and an occupation status value configured to indicate whether the cell number to be adjusted is within the bearer cell group of the sending end.

Regardless of the way of sending the adjustment information, the adjustment information may include the cell number to be adjusted and the occupation status value in order to clearly indicate the adjustment operation.

The cell number to be adjusted is configured to clearly indicate the cell to be adjusted (to be occupied, or to be released from being occupied) which has the number the same as the cell number to be adjusted, and whether the cell number to be adjusted is within the bearer cell group of the sending end may be determined according to the occupation status value, so that the corresponding adjustment operation may be performed. If the occupation status value of the adjustment information indicates that the cell number to be adjusted is within the bearer cell group of the sending end, the corresponding adjustment operation is adding the cell number to be adjusted to the bearer cell group of the sending end; otherwise, the corresponding adjustment operation is deleting the cell number to be adjusted from the bearer cell group of the sending end.

For example, with reference to FIG. 6, in the adjustment information (which may be a part of the cell), the occupation status value (U) being "0" may indicate that the cell number to be adjusted is not within the bearer cell group of the sending end, and the occupation status value (U) being "1" may indicate that the cell number to be adjusted is within the bearer cell group of the sending end.

Thus, if the adjustment operation is adding the cell number to be adjusted to the bearer cell group of the sending end, the occupation status value of the adjustment information is set to "1" (for example, the occupation status value is changed from 0 to 1); and if the adjustment operation is deleting the cell number to be adjusted from the bearer cell group of the sending end, the occupation status value of the adjustment information is set to "0" (for example, the occupation status value is changed from 1 to 0).

The adjustment information may be transmitted simply and conveniently through the occupation status value.

Figure 7:
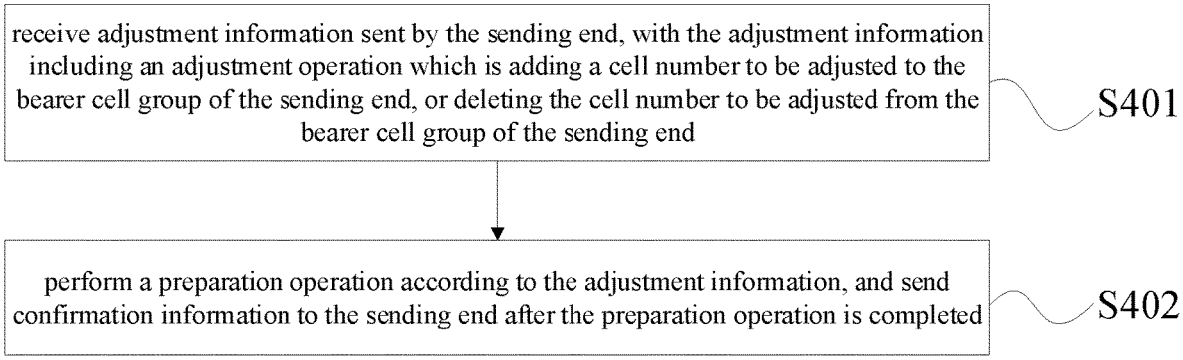
FIG. 7 is a flowchart illustrating a bandwidth adjustment method applicable to a receiving end according to an embodiment of the present disclosure.

In a second aspect, with reference to FIG. 7, an embodiment of the present disclosure provides a bandwidth adjustment method applicable to a receiving end. The receiving end receives cells periodically sent by a sending end, and the number of the cells sent in each period is n which is an integer greater than or equal to 2; in each period, the sending end occupies a cell having a number that is within a bearer cell group of the sending end, and the occupied cell may carry service information.

The sending end (such as a mobile phone, or a computer) occupies part of cells transmitted on a network physical pipe to carry and send the service information to the receiving end, and the receiving end receives the service information. Since several times of transmission may be needed for completely transmitting all the service information to the receiving end, a transmission process of the service information is carried out periodically, that is, the sending end continuously sends the service information to the receiving end through the cells according to a certain rule.

It should be noted that not all occupied (activated) cells carry the service information in the transmission process of the service information, and an occupied cell may have no load in a certain information transmission process (that is, the cell is still occupied but does not carry the service information).

The bandwidth adjustment method provided by the embodiment of the present disclosure may include S401 and S402.

In S401, adjustment information sent by the sending end is received, with the adjustment information including an adjustment operation which is adding a cell number to be adjusted to the bearer cell group of the sending end, or deleting the cell number to be adjusted from the bearer cell group of the sending end.

The receiving end receives the adjustment information sent by the sending end. The adjustment information includes the adjustment operation to add the cell number to be adjusted to the bearer cell group of the sending end (that is, activating a cell to increase a bandwidth), or the adjustment operation to delete the cell number to be adjusted from the bearer cell group of the sending end (that is, stopping using a cell to reduce the bandwidth).

In S402, a preparation operation is performed according to the adjustment information, and confirmation information is sent to the sending end after the preparation operation is completed.

After receiving the adjustment information, the receiving end performs a corresponding preparation operation according to the adjustment information, and sends the confirmation information to the sending end after the preparation operation is completed to indicate that the receiving end has completed the preparation operation.

When the receiving end receives the adjustment information requesting addition of the cell number to be adjusted to the bearer cell group of the sending end, it is indicated that the sending end needs to increase the bandwidth, that is, the sending end needs to occupy an unoccupied cell (a cell having a number the same as the cell number to be adjusted). Then the receiving end adds the cell number to be adjusted to the bearer cell group of the sending end, and receives, in each following period, the service information carried by the cell having the number the same as the cell number to be adjusted.

When the receiving end receives the adjustment information requesting deletion of the cell number to be adjusted from the bearer cell group of the sending end, it is indicated that the sending end needs to reduce the bandwidth, that is, the sending end needs to release some occupied cells (the cells having number the same as the cell number to be adjusted). Then the receiving end deletes the cell number to be adjusted from the bearer cell group of the sending end, and stops, in each following period, receiving the service information carried by the cells having the number the same as the cell number to be adjusted.

After the preparation operation is completed, the confirmation information indicating that the preparation operation is completed is sent to the sending end.

If the adjustment information is wrong (for example, the cell whose number is the cell number to be adjusted is not available to the sending end because the cell is already occupied by another terminal, but the adjustment operation is adding the cell number to be adjusted to the bearer cell group of the sending end), no confirmation information is sent to the sending end.

Figure 8:
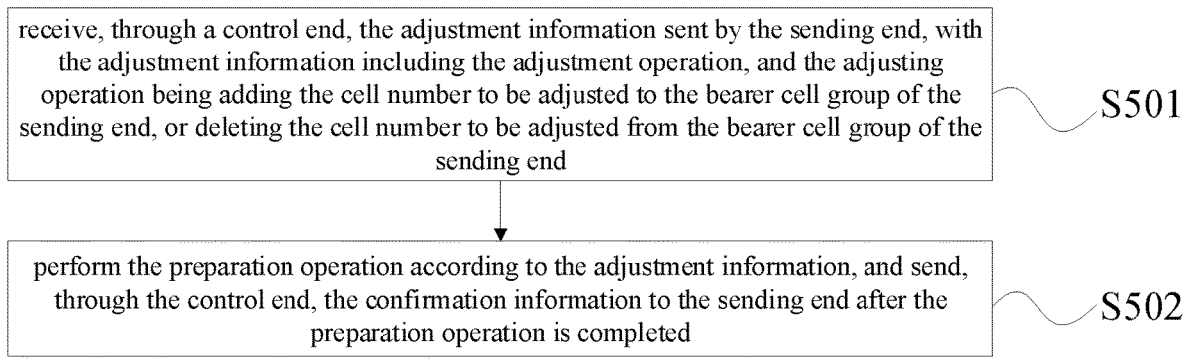
FIG. 8 is a flowchart illustrating another bandwidth adjustment method applicable to the receiving end according to an embodiment of the present disclosure.

In some embodiments, as shown in FIG. 8, receiving the adjustment information sent by the sending end, with the adjustment information including the adjustment operation, and the adjusting operation being adding the cell number to be adjusted to the bearer cell group of the sending end, or deleting the cell number to be adjusted from the bearer cell group of the sending end (S401) includes: S501, receiving, through a control end, the adjustment information sent by the sending end, with the adjustment information including the adjustment operation, and the adjusting operation being adding the cell number to be adjusted to the bearer cell group of the sending end, or deleting the cell number to be adjusted from the bearer cell group of the sending end.

Performing the preparation operation according to the adjustment information, and sending the confirmation information to the sending end after the preparation operation is completed (S402) includes: S502, performing the preparation operation according to the adjustment information, and sending, through the control end, the confirmation information to the sending end after the preparation operation is completed.

As shown in FIG. 3, it may be the case that the sending end and the receiving end send the information to the control end and receive the information from the control end. That is, instead of directly sending the adjustment information by the sending end to the receiving end, the sending end and the receiving end contact the control end respectively.

When the sending end needs to increase the bandwidth, that is, to occupy more cells, the sending end "informs" the control end of the adjustment information requesting addition of the cell number to be adjusted to the bearer cell group of the sending end, and the control end simultaneously sends preparation commands to the sending end and the receiving end (sending the adjustment information to the receiving end) after receiving the adjustment information. After receiving the command, the receiving end performs the preparation operation (the receiving end adds the cell number to be adjusted to the bearer cell group of the sending end, and prepares to read the service information from the cell having the number the same as the cell number to be adjusted later), and sends, after the preparation operation is completed, the information indicating being prepared to the control end. After receiving the information sent by the two ends, the control end forwards the information sent by the sending end to the receiving end, and forwards the information sent by the receiving end to the sending end, so as to inform the two ends that both are prepared. The receiving end prepares to receive the service information carried by the cell having the number the same number as the cell number to be adjusted and other occupied cells.

When the sending end needs to reduce the bandwidth, that is, to release some occupied cells, the sending end "informs" the control end of the adjustment information requesting deletion of the cell number to be adjusted from the bearer cell group of the sending end, and the control end simultaneously sends preparation commands to the sending end and the receiving end (sending the adjustment information to the receiving end) after receiving the adjustment information. After receiving the command, the receiving end performs the preparation operation (the receiving end deletes the cell number to be adjusted from the bearer cell group of the sending end, and prepares to stop reading the service information from the cell having the number the same as the cell number to be adjusted), and sends, after the preparation operation is completed, the information indicating being prepared to the control end. After receiving the information sent by the two ends, the control end forwards the information sent by the sending end to the receiving end, and forwards the information sent by the receiving end to the sending end, so as to inform the two ends that both are prepared. The receiving end receives the service information carried by other occupied cells except the cell having the number the same as the cell number to be adjusted.

Serving as an information transmission end between the sending end and the receiving end in the bandwidth adjustment process, the control end may distinguish the information (the adjustment information, the confirmation information, etc.) sent and received in the bandwidth adjustment process from the service information, so as to facilitate processing different information differently. Meanwhile, the control end may be aware of states of the sending end and the receiving end through the communication with the sending end and the receiving end, so as to issue the commands in a centralized manner, thereby increasing the efficiency of service bandwidth adjustment.

That is, the receiving end may send the confirmation information to the sending end in an "out-of-band" way, that is, transmitting the confirmation information through a physical channel different from that of the cells. Similarly, the adjustment information is sent by the sending end in an out-of-band way, and is accordingly received by the receiving end in an out-of-band way. Such out-of-band transmission has the advantage that the transmission of the adjustment information or the confirmation information and the transmission of the cells are totally independent of each other and do not affect each other, that is, when a network for the transmission of the adjustment information or the confirmation information fails, the transmission of the cells will not be affected, and vice versa.

Of course, when the "out-of-band" way is adopted in the bandwidth adjustment process, a specific form of the adjustment information may vary, which will be described in detail later.

Figure 9:
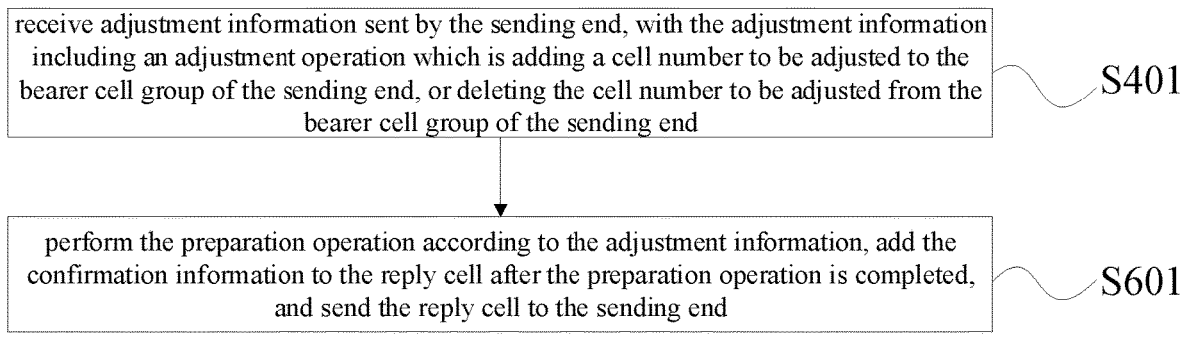
FIG. 9 is a flowchart illustrating still another bandwidth adjustment method applicable to the receiving end according to an embodiment of the present disclosure.

In some embodiments, as shown in FIG. 9, in a case where the receiving end sends a reply cell to the sending end periodically, performing the preparation operation according to the adjustment information, and sending the confirmation information to the sending end after the preparation operation is completed (S402) includes: S601, performing the preparation operation according to the adjustment information, adding the confirmation information to the reply cell after the preparation operation is completed, and sending the reply cell to the sending end.

Since the receiving end sends the reply cell to the sending end periodically, the confirmation information may also be sent to the sending end together with the reply cell, that is, the confirmation information is inside the reply cell and is sent to the sending end as a part of the reply cell. Correspondingly, the adjustment information may also be sent together with a cell and is received as a part of the cell. Thus, merely one physical channel is needed, which reduces the transmission cost.

In some embodiments, as shown in FIG. 6, the confirmation information includes:
the cell number the to be adjusted; and
and an information response value configured to indicate whether the preparation operation is completed by the receiving end.

Regardless of the way of sending the confirmation information, the confirmation information may include the cell number to be adjusted and the information response value in order to clearly indicate that the confirmation information is the confirmation information corresponding to the cell number to be adjusted.

The cell number to be adjusted is configured to clearly indicate a cell to be adjusted (to be occupied or to be released from being occupied) which has a number the same as the cell number to be adjusted. The sending end may know that the corresponding preparation operation is completed by the receiving end through the information response value.

For example, with reference to FIG. 6, in the adjustment information (which may be a part of the cell), the information response value (R) being "1" may indicate that the preparation operation is completed by the receiving end. If the preparation operation is completed by the receiving end, the information response value of the adjustment information is set to "1" and is sent to the sending end. If the preparation operation is not completed by the receiving end, no confirmation information is fed back to the sending end.

The information response value can simply indicate whether the preparation operation is completed by the receiving end, and can be easily embedded into a cell to be transmitted, thereby improving the efficiency.

Figure 10:
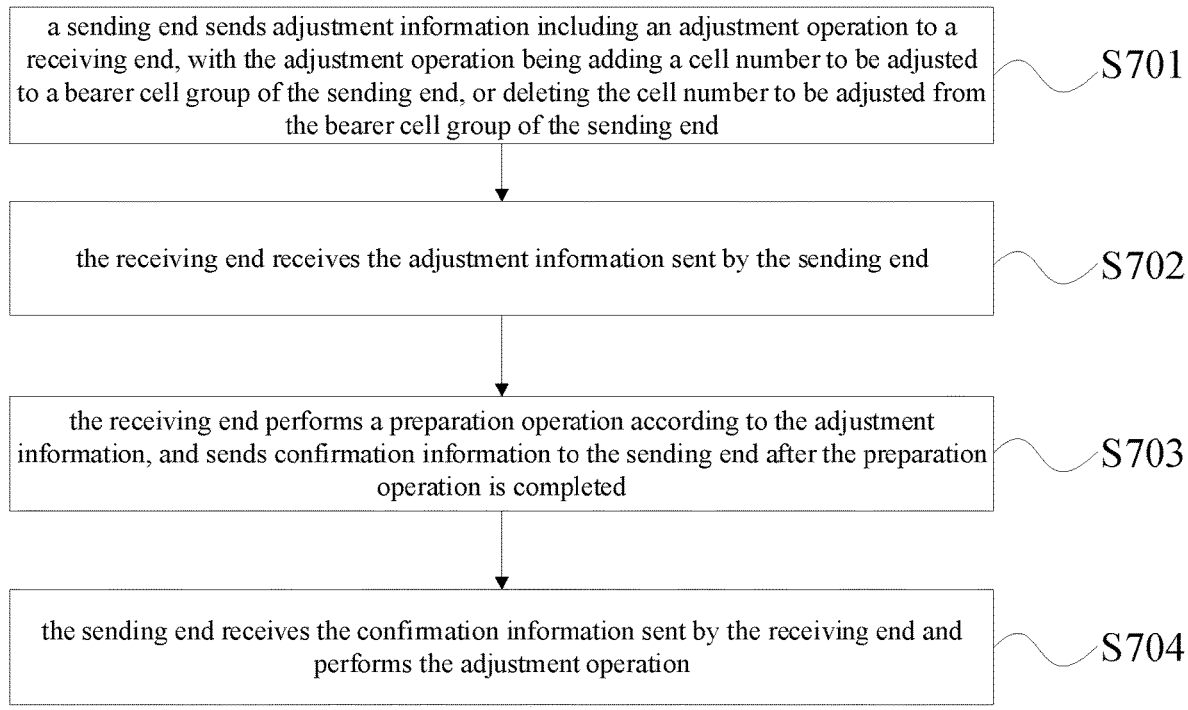
FIG. 10 is a flowchart illustrating a bandwidth adjustment method according to an embodiment of the present disclosure.

In a third aspect, with reference to FIG. 10, an embodiment of the present disclosure provides a bandwidth adjustment method, which may include S701 to S704.

In S701, a sending end sends adjustment information including an adjustment operation to a receiving end, with the adjustment operation being adding a cell number to be adjusted to a bearer cell group of the sending end, or deleting the cell number to be adjusted from the bearer cell group of the sending end.

In S702, the receiving end receives the adjustment information sent by the sending end.

In S703, the receiving end performs a preparation operation according to the adjustment information, and sends confirmation information to the sending end after the preparation operation is completed.

In S704, the sending end receives the confirmation information sent by the receiving end and performs the adjustment operation.

The sending end sends the adjustment information to the receiving end (the adjustment information is not necessarily sent to the receiving end through cells, which will be described in detail later).

The adjustment information is configured to indicate that the sending end is to add the cell number to be adjusted to the bearer cell group of the sending end (that is, activating a cell to increase a bandwidth), or the sending end is to delete the cell number to be adjusted from the bearer cell group of the sending end (that is, stopping using a cell to reduce the bandwidth).

The receiving end performs the corresponding preparation operation according to the adjustment information, and sending, after the preparation operation is completed, the confirmation information to the sending end to indicate that the preparation operation is completed by the receiving end.

When the receiving end receives the adjustment information requesting addition of the cell number to be adjusted to the bearer cell group of the sending end, it is indicated that the sending end needs to increase the bandwidth, that is, the sending end needs to occupy an unoccupied cell (a cell having a number the same as the cell number to be adjusted). Then the receiving end adds the cell number to be adjusted to the bearer cell group of the sending end, and receives, in each following period, service information carried by the cell having the number the same as the cell number to be adjusted.

When the receiving end receives the adjustment information requesting deletion of the cell number to be adjusted from the bearer cell group of the sending end, it is indicated that the sending end needs to reduce the bandwidth, that is, the sending end needs to release some occupied cells (the cells having a number the same as the cell number to be adjusted). Then the receiving end deletes the cell number to be adjusted from the bearer cell group of the sending end, and stops, in each following period, receiving service information carried by the cells having the number the same as the cell number to be adjusted.

After the preparation operation is completed, the confirmation information indicating that the preparation operation is completed is sent to the sending end.

After the sending end receives the confirmation information (i.e., the information indicating that the sending end is allowed to adjust the bandwidth) fed back by the receiving end, the sending end performs the adjustment operation corresponding to the adjustment information.

If the corresponding adjustment operation is adding the cell number to be adjusted to the bearer cell group of the sending end, it is indicated that the sending end may occupy a cell having a number the same as the cell number to be adjusted, that is, in each following period, the sending end may occupy the cell whose number is the cell number to be adjusted, and load the service information in the cell having the number the same as the cell number to be adjusted to send the service information to the receiving end.

If the corresponding adjustment operation is deleting the cell number to be adjusted from the bearer cell group of the sending end, an occupied cell having a number the same as the cell number to be adjusted needs to be released, that is, in each following period, the service information may not be loaded in the cell having the number the same as the cell number to be adjusted, and the cell having the number the same as the cell number to be adjusted is vacated, and may be occupied by other terminals for transmission of service information thereof.

In the bandwidth adjustment process, the transmission of information such as the adjustment information and the confirmation information does not affect normal transmission of the cells (the adjustment information and the confirmation information may be transmitted through other physical pipes, without affecting the transmission of the cells). Thus, a service of a client will not be interrupted, a smooth change of the bandwidth is realized through the cooperation of the sending end and the receiving end, normal transmission of the service information is not affected in the smooth change, and interruption of the service and errors of the service are not incurred.

In some embodiments, the adjustment information and the confirmation information may be transmitted together with a cell, that is, the adjustment information is inside a cell to be adjusted and is a part of the cell.

The structure of the cell may be found in FIG. 6. In the cell, the value SQ is a number of a cell to be adjusted; and the value U is an occupation status value and is configured to indicate whether the cell number to be adjusted is within a bearer cell group. If the cell number to be adjusted is within a bearer cell group of a certain terminal, it is indicated that a cell having a number the same as the cell number to be adjusted is not available any more. If the cell number to be adjusted is not within any bearer cell group, it is indicated that the cell is an idle cell and does not belong to any bearer cell group of any client, thus being available to any client. The value R is an information response value configured to indicate whether the preparation operation is completed by the receiving end, and is a handshake response signal sent back from the receiving end to the sending end. The value E is a loading status value and indicates whether a current cell carries client information (an idle state or a loaded state). After a cell is occupied, the cell belongs to a bearer cell group of a certain terminal. However, when a client has a low speed and fails to use all cells, some cells (equivalent to idle cells) are in an idle state and do not carry the client information.

An exemplary process is as follows.

When the sending end needs to increase the bandwidth, that is, to occupy more cells, the sending end firstly changes an occupation status value of a cell having a number the same as the cell number to be adjusted from a value indicating that the cell number to be adjusted is not within any bearer cell group to a value indicating that the cell number to be adjusted is within a bearer cell group, and meanwhile the sending end sets the information response value to a value different from a value indicating the preparation operation is completed, and sends to the receiving end.

When the receiving end detects that the occupation status value of the cell is changed from the value indicating that the cell number to be adjusted is not within any bearer cell group to the value indicating that the cell number to be adjusted is within a bearer cell group, the receiving end adds the cell number to be adjusted to a bearer cell group of the sending end, at this time, the preparation operation at the receiving end is completed.

The receiving end selects a reply cell to carry and send the confirmation information (desirably, a cell having a number the same as the cell number to be adjusted is selected) to the sending end, that is, changing an information response value of the reply cell to a value indicating that the preparation operation is completed.

If the sending end detects, after receives the reply cell, that the receiving end is prepared, the sending end switches the cell having the number the same as the cell number to be adjusted from an idle state to a loaded state, and loads contents of the client information on the cell having the number the same as the cell number to be adjusted, thus meeting a demand for bandwidth increase.

When the sending end needs to reduce the bandwidth, that is, to release some occupied cells, if an occupation status value of the cell having the number the same as the cell number to be adjusted is directly changed from the value indicating that the cell number to be adjusted is within a bearer cell group to the value indicating that the cell number to be adjusted is not within any bearer cell group, the cell having the number the same as the cell number to be adjusted may be considered as an idle cell by other clients and then be occupied. Therefore, when the cell is used to transmit the adjustment information, a new value, i.e., the value E (the loading status value) is needed.

When some occupied cells need to be released, the sending end firstly switches the cell having the number the same as the cell number to be adjusted from the loaded state to the idle state, that is, stopping loading the contents of the client information on the cell.

After the adjusted cell is sent to the receiving end, the receiving end starts a preparation operation for deletion when the receiving end detects that the cell is switched from the loaded state to the idle state, and sends the reply cell including the confirmation information to the sending end after the preparation operation is completed.

After receiving the reply cell, the sending end stops occupying the cell having the number the same as the cell number to be adjusted, so that the cell becomes an idle cell for other terminals to use, that is, the other terminals may add the cell number to be adjusted to the bearer cell group thereof.

In practical applications, when the service receiving end detects that a cell is changed from the loaded state to the idle state, deletion of the number of the cell from a bearer cell group may need to be performed, or the cell is changed to the idle state just because a rate at the sending end is temporarily insufficient.

Therefore, the receiving end needs to recognize the reason for the change of the state of the cell, and determine whether to delete the cell number from the bearer cell group. After determining whether to delete the cell number from the bearer cell group, the receiving end performs the preparation operation.

Various methods may be adopted for determining whether to delete the cell number from the bearer cell group, such as a multiple judgment principle: if it is detected for multiple consecutive times that a corresponding cell is in the idle state (for example, it is detected for three consecutive times the cell corresponding to the cell number has no load), it is determined that the cell number needs to be deleted from the bearer cell group, and the preparation operation may be performed accordingly.

In some embodiments, the sending end and the receiving end send the information to the control end and receive the information from the control end.

That is, instead of directly sending the adjustment information by the sending end to the receiving end, the sending end and the receiving end contact the control end respectively.

When the sending end needs to increase the bandwidth, that is, to occupy more cells, the sending end "informs" the control end of the adjustment information requesting addition of the cell number to be adjusted to the bearer cell group of the sending end, and the control end simultaneously sends preparation commands to the sending end and the receiving end (sending the adjustment information to the receiving end, and sending the information, which indicates that the adjustment information is sent to the receiving end, to the sending end) after receiving the adjustment information.

The sending end makes preparations after receiving the command (the sending end occupies the cell having the number the same as the cell number to be adjusted, but does not load the service information in the cell). After receiving the command, the receiving end performs the preparation operation (the receiving end adds the cell number to be adjusted to the bearer cell group of the sending end, and prepares to read the service information from the cell having the number the same as the cell number to be adjusted later).

After the preparation operation is completed, the sending end and the receiving end send the information indicating being prepared to the control end. After receiving the information sent by the two ends, the control end forwards the information sent by the sending end to the receiving end, and forwards the information sent by the receiving end to the sending end, so as to inform the two ends that both are prepared.

The sending end loads the service information in the cell having the number the same as the cell number to be adjusted after receiving the information, and the receiving end prepares to receive the service information carried by the cell having the number of the cell number to be adjusted and other occupied cells.

When the sending end needs to reduce the bandwidth, that is, to release some occupied cells, the sending end "informs" the control end of the adjustment information requesting deletion of the cell number to be adjusted from the bearer cell group of the sending end, and the control end simultaneously sends preparation commands to the sending end and the receiving end (sending the adjustment information to the receiving end, and sending the information, which indicates that the adjustment information is sent to the receiving end, to the sending end) after receiving the adjustment information.

The sending end makes preparations after receiving the command (the sending end stops loading the service information in the cell having the number the same as the cell number to be adjusted, and the receiving end performs the preparation operation (the receiving end deletes the cell number to be adjusted from the bearer cell group of the sending end, and prepares to stop reading the service information from the cell having the number the same as the cell number to be adjusted later) after receiving the command.

After being prepared, the sending end and the receiving end send the information indicating being prepared to the control end. After receiving the information sent by the two ends, the control end forwards the information sent by the sending end to the receiving end, and forwards the information sent by the receiving end to the sending end, so as to inform the two ends that both are prepared.

After receiving the confirmation information, the sending end stops occupying the cell having the number the same as the cell number to be adjusted, that is, stopping using the cell having the number the same as the cell number to be adjusted to carry the service information, and the receiving end receives the service information carried by other occupied cells except the cell having the number of the cell number to be adjusted.

Serving as an information transmission end between the sending end and the receiving end in the bandwidth adjustment process, the control end may distinguish the information (the adjustment information, the confirmation information, etc.) sent and received in the bandwidth adjustment process from the service information, so as to facilitate processing different information differently. Meanwhile, the control end may be aware of the states of the sending end and the receiving end through the communication with the sending end and the receiving end, so as to issue the commands in a centralized manner, thereby increasing the efficiency of service bandwidth adjustment.

Figure 11:
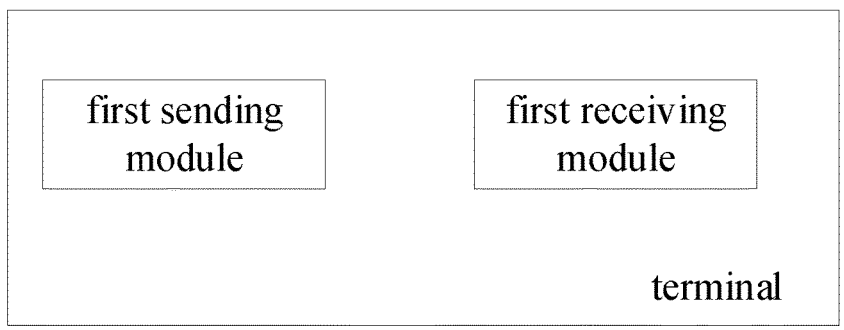
FIG. 11 is a block diagram of a terminal according to an embodiment of the present disclosure.

In a fourth aspect, with reference to FIG. 11, an embodiment of the present disclosure provides a terminal, which periodically sends cells to a receiving end, and the number of the cells sent in each period is n which is an integer greater than or equal to 2; in each period, the terminal occupies a cell having a number that is within a bearer cell group of the terminal, and the occupied cell may carry service information. The terminal includes: a first sending module configured to send adjustment information including an adjustment operation to the receiving end, with the adjustment operation being adding a cell number to be adjusted to a bearer cell group of a sending end, or deleting the cell number to be adjusted from the bearer cell group of the sending end; and a first receiving module configured to receive confirmation information sent by the receiving end, and perform the adjustment operation.

Figure 12:
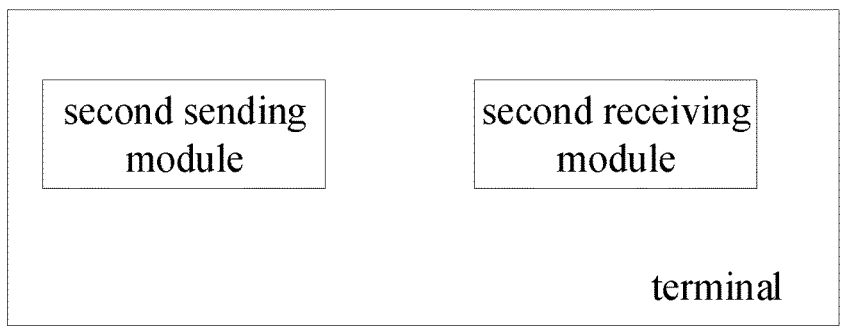
FIG. 12 is a block diagram of another terminal according to an embodiment of the present disclosure.

In a fifth aspect, with reference to FIG. 12, an embodiment of the present disclosure provides a terminal, which receives cells periodically sent by a sending end, and the number of the cells sent in each period is n which is an integer greater than or equal to 2; in each period, the sending end occupies a cell having a number that is within a bearer cell group of the sending end, and the occupied cell may carry service information. The terminal includes: a second receiving module configured to receive adjustment information sent by the sending end, with the adjustment information including an adjustment operation which is adding a cell number to be adjusted to the bearer cell group of the sending end, or deleting the cell number to be adjusted from the bearer cell group of the sending end; and a second sending module configured to perform a preparation operation according to the adjustment information, and send confirmation information to the sending end after the preparation operation is completed.

It should be understood by those of ordinary skill in the art that the functional modules/units in all or some of the operations, the systems and the devices disclosed above may be implemented as software, firmware, hardware, or suitable combinations thereof.

If implemented as hardware, the division between the functional modules/units described above is not necessarily corresponding to the division of physical components; for example, one physical component may have a plurality of functions, or one function or operation may be performed through cooperation of several physical components.

Some or all of the physical components may be implemented as software executed by a processor, such as a central processing unit (CPU), a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM, more specifically, a Synchronous Dynamic RAM (SDRAM), a Double Data Rate SDRAM (DDR SDRAM), etc.), a Read Only Memory (ROM), an Electrically Erasable Programmable Read-Only Memory (EEPROM), a flash memory or other magnetic storage device; a Compact Disc Read Only Memory (CD-ROM), a Digital Versatile Disc (DVD) or other optical discs; a magnetic cassette, a magnetic tape, a magnetic disk or other magnetic storage devices; and any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. In some embodiments, unless expressly stated otherwise, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure stated in the appended claims.

What is claimed is:

1. A bandwidth adjustment method applicable to a sending end, wherein the sending end is configured to periodically send cells to a receiving end, and a number of the cells sent in each period is n, where n is an integer greater than or equal to 2; in each period, the sending end is configured to occupy a cell having a number that is carried by the cell and within a bearer cell group of the sending end, the occupied cell is capable of carrying service information, and the method comprises:

sending adjustment information comprising an adjustment operation to the receiving end, with the adjustment operation being adding a cell number to be adjusted to the bearer cell group of the sending end to indicate that the sending end is to occupy a cell having a number the same as the cell number to be adjusted for carrying service information on the cell having the number the same as the cell number to be adjusted, thereby increasing a bandwidth of the sending end, or deleting the cell number to be adjusted from the bearer cell group of the sending end to indicate that the sending end is to release an occupied cell having a number the same as the cell number to be adjusted, thereby reducing a bandwidth of the sending end; and receiving confirmation information sent by the receiving end after a preparation operation is completed by the receiving end, and performing the adjustment operation-, wherein the confirmation information comprises: the cell number to be adjusted; and an information response value configured to indicate whether the preparation operation is completed by the receiving end, and wherein the preparation operation comprises: adding the cell number to be adjusted to the bearer cell group of the sending end, and preparing to read service information from a cell having a number the same as the cell number to be adjusted, or deleting the cell number to be adjusted from the bearer cell group of the sending end, and preparing to stop reading service information from a cell having a number the same as the cell number to be adjusted.

2. The method of claim 1, wherein,
sending the adjustment information to the receiving end comprises: sending the adjustment information to the receiving end through a control end; and
receiving the confirmation information sent by the receiving end comprises: receiving, through the control end, the confirmation information sent by the receiving end.

3. The method of claim 1, wherein sending the adjustment information to the receiving end comprises:
adding the adjustment information to a cell having a number the same as the cell number to be adjusted, and sending the cell to the receiving end.

4. The method of claim 3, wherein,
the cell comprises a loading status value configured to indicate whether the cell carries the service information; and
adding the adjustment information to the cell having the number the same as the cell number to be adjusted comprises: if the adjustment operation is deleting the cell number to be adjusted from the bearer cell group of the sending end, setting loading status values of a plurality of continuous cells having a number the same as the cell number to be adjusted to a value indicating that the cells do not carry the service information.

5. The method of claim 1, wherein the adjustment information comprises:
the cell number to be adjusted; and
an occupation status value configured to indicate whether the cell number to be adjusted is within the bearer cell group of the sending end.

6. A bandwidth adjustment method applicable to a receiving end, wherein the receiving end is configured to receive cells periodically sent by a sending end, and a number of the cells sent in each period is n, where n is an integer greater than or equal to 2; in each period, the sending end is configured to occupy a cell having a number that is carried by the cell and within a bearer cell group of the sending end, the occupied cell is capable of carrying service information, and the method comprises:
receiving adjustment information sent by the sending end, with the adjustment information comprising an adjustment operation which is adding a cell number to be adjusted to the bearer cell group of the sending end to indicate that the sending end is to occupy a cell having a number the same as the cell number to be adjusted for carrying service information on the cell having the number the same as the cell number to be adjusted, thereby increasing a bandwidth of the sending end, or deleting the cell number to be adjusted from the bearer cell group of the sending end to indicate that the sending end is to release an occupied cell having a number the same as the cell number to be adjusted, thereby reducing a bandwidth of the sending end; and
performing a preparation operation according to the adjustment information, and sending confirmation information to the sending end after the preparation operation is completed,
wherein the confirmation information comprises: the cell number to be adjusted; and an information response value configured to indicate whether the preparation operation is completed by the receiving end, and
wherein the preparation operation comprises: adding the cell number to be adjusted to the bearer cell group of the sending end, and preparing to read service information from a cell having a number the same as the cell number to be adjusted, or deleting the cell number to be adjusted from the bearer cell group of the sending end, and preparing to stop reading service information from a cell having a number the same as the cell number to be adjusted.

7. The method of claim 6, wherein,
receiving the adjustment information sent by the sending end comprises: receiving, through a control end, the adjustment information sent by the sending end; and
sending the confirmation information to the sending end comprises: sending the confirmation information to the sending end through the control end.

8. The method of claim 6, wherein the receiving end is configured to send a reply cell to the sending end periodically, and sending the confirmation information to the sending end comprises:
adding the confirmation information to the reply cell, and sending the reply cell to the sending end.

9. A terminal, wherein the terminal is configured to receive cells periodically sent by a sending end, a number of the cells sent in each period is n, where n is an integer greater than or equal to 2; in each period, the sending end is configured to occupy a cell having a number that is carried by the cell and within a bearer cell group of the sending end, the occupied cell is capable of carrying service information, and the terminal comprises a processor and a storage having instructions stored thereon which, when being executed by the processor, cause the processor to perform the method of claim 6.

10. A terminal, wherein the terminal is configured to periodically send cells to a receiving end, a number of the cells sent in each period is n, where n is an integer greater than or equal to 2; in each period, the terminal is configured to occupy a cell having a number that is carried by the cell and within a bearer cell group of the terminal, the occupied cell is capable of carrying service information, and the terminal comprises a processor and a storage having instructions stored thereon which, when being executed by the processor, cause the processor to:
send adjustment information comprising an adjustment operation to the receiving end, with the adjustment operation being adding a cell number to be adjusted to a bearer cell group of the terminal to indicate that the terminal is to occupy a cell having a number the same as the cell number to be adjusted for carrying service information on the cell having the number the same as the cell number to be adjusted, thereby increasing a bandwidth of the terminal, or deleting the cell number to be adjusted from the bearer cell group of the terminal to indicate that the terminal is to release an occupied cell having a number the same as the cell number to be adjusted, thereby reducing a bandwidth of the terminal; and
receive confirmation information sent by the receiving end after a preparation operation is completed by the receiving end, and perform the adjustment operation,
wherein the confirmation information comprises: the cell number to be adjusted; and an information response value configured to indicate whether the preparation operation is completed by the receiving end, and
wherein the preparation operation comprises: adding the cell number to be adjusted to the bearer cell group of the terminal, and preparing to read service information from a cell having a number the same as the cell number to be adjusted, or deleting the cell number to be adjusted from the bearer cell group of the terminal, and preparing to stop reading service information from a cell having a number the same as the cell number to be adjusted.

* * * * *